(12) United States Patent
Sheriff

(10) Patent No.: US 11,620,294 B2
(45) Date of Patent: Apr. 4, 2023

(54) DYNAMIC MEDIA DATA MANAGEMENT

(71) Applicant: Panasonic Avionics Corporation, Lake Forest, CA (US)

(72) Inventor: FaizalSheriff Kalifullah Sheriff, Irvine, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 285 days.

(21) Appl. No.: 16/777,746

(22) Filed: Jan. 30, 2020

(65) Prior Publication Data
US 2021/0240723 A1   Aug. 5, 2021

(51) Int. Cl.
*G06F 16/00* (2019.01)
*G06F 16/2457* (2019.01)
(Continued)

(52) U.S. Cl.
CPC ...... *G06F 16/24578* (2019.01); *G06F 16/182* (2019.01); *G06F 16/387* (2019.01);
(Continued)

(58) Field of Classification Search
CPC .. G06F 16/24578; G06F 16/48; G06F 16/435; G06F 16/182; G06F 16/168; G06F 16/1873; G06F 16/244; G06F 16/40; G06F 16/70; G06F 16/4393; G06F 21/316; G06F 3/165; G06F 16/43; G06F 16/438; G06F 16/472; G06F 16/387; G06F 3/04815;
(Continued)

(56) References Cited

U.S. PATENT DOCUMENTS 8,659,990 B2 * 2/2014 Petrisor ............. H04N 21/2221
370/242
9,230,379 B2 * 1/2016 Ricci ................... A61B 5/6808
(Continued)

FOREIGN PATENT DOCUMENTS

WO   WO2005079310 A2 * 9/2005
WO   WO2006026613 A2 * 3/2006
(Continued)

OTHER PUBLICATIONS

Bhavesh Hiranandani et al., "User Throughput-Based Quality of Experience Evaluation for in Flight Video Streaming", Wireless Telecommunications Symposium (WTS), Apr. 2018, pp. 1-6.*
(Continued)

*Primary Examiner* — Srirama Channavajjala
(74) *Attorney, Agent, or Firm* — Perkins Coie LLP

(57) ABSTRACT

A system for managing media content data sets loaded onto a content server has a media content repository storing media content data items. A usage data aggregator retrieves usage log data from each passenger terminal device of the vehicle entertainment system. A load set generator builds a ranked media content data set based upon prioritization scores assigned to each of the media content data items with adaptive inferences from the usage log data. The prioritization scores are correlated with trip factors established for a subsequent vehicle trip for which the ranked media content data set is being built. A content retriever transfers the one or more media content data items specified in the ranked media content data from the media content repository.

20 Claims, 3 Drawing Sheets

(51) Int. Cl.
    *G06F 16/48*           (2019.01)
    *H04N 21/472*        (2011.01)
    *H04H 20/62*         (2008.01)
    *G06F 16/182*        (2019.01)
    *G06F 16/387*        (2019.01)
    *G06F 16/40*           (2019.01)
    *G06F 16/43*           (2019.01)
    *G06F 16/435*        (2019.01)
    *G06F 16/438*        (2019.01)

(52) U.S. Cl.
    CPC .............. *G06F 16/40* (2019.01); *G06F 16/43* (2019.01); *G06F 16/435* (2019.01); *G06F 16/438* (2019.01); *G06F 16/48* (2019.01); *H04H 20/62* (2013.01); *H04N 21/472* (2013.01); *H04H 2201/11* (2013.01)

(58) Field of Classification Search
    CPC ............. H04H 21/472; H04H 21/2146; H04H 21/266; H04H 2201/11; G06Q 30/02; H04N 21/4424; H04N 21/47211; H04N 21/47815; H04N 21/6581; H04N 21/8126; H04N 7/163; H04N 7/17318; H04N 21/214
    See application file for complete search history.

(56) References Cited

U.S. PATENT DOCUMENTS

| | | | | |
|---|---|---|---|---|
| 9,430,532 | B2* | 8/2016 | Basilico | G06F 16/735 |
| 9,558,455 | B2* | 1/2017 | Johnson | G06F 3/0416 |
| 10,438,172 | B2* | 10/2019 | Rangan | G06Q 10/1095 |
| 10,832,261 | B1* | 11/2020 | Chan | G06Q 40/025 |
| 2006/0136106 | A1* | 6/2006 | Patenaude | B60R 16/0231 |
| | | | | 307/10.1 |
| 2008/0141315 | A1* | 6/2008 | Ogilvie | H04N 7/15 |
| | | | | 725/77 |
| 2009/0119721 | A1* | 5/2009 | Perlman | H04N 21/2146 |
| | | | | 725/75 |
| 2009/0319341 | A1* | 12/2009 | Berkobin | G06Q 30/02 |
| | | | | 705/14.62 |
| 2010/0138879 | A1* | 6/2010 | Bird | H04L 65/60 |
| | | | | 725/76 |
| 2010/0293033 | A1* | 11/2010 | Hall | G06Q 30/02 |
| | | | | 705/14.1 |
| 2011/0161172 | A1* | 6/2011 | Lee | H04L 67/025 |
| | | | | 709/224 |
| 2013/0063612 | A1* | 3/2013 | Royster | B64D 11/0624 |
| | | | | 348/739 |
| 2013/0167168 | A1* | 6/2013 | Ellis | H04N 5/50 |
| | | | | 725/12 |
| 2014/0032660 | A1* | 1/2014 | Nguyen | G06F 16/00 |
| | | | | 709/204 |
| 2014/0113619 | A1* | 4/2014 | Tibbitts | B60W 40/09 |
| | | | | 455/419 |
| 2015/0135225 | A1 | 5/2015 | Bayer et al. | |
| 2015/0227838 | A1* | 8/2015 | Wang | G16H 40/40 |
| | | | | 706/12 |
| 2016/0156951 | A1 | 6/2016 | Perinchery et al. | |
| 2016/0274744 | A1* | 9/2016 | Neumann | H04N 21/4668 |
| 2016/0285542 | A1* | 9/2016 | Du | H04N 21/2747 |
| 2017/0283086 | A1* | 10/2017 | Garing | B64D 45/0051 |
| 2018/0136005 | A1* | 5/2018 | Forutanpour | G01C 21/3476 |
| 2018/0189226 | A1 | 7/2018 | Hofverberg et al. | |
| 2018/0203937 | A1* | 7/2018 | Brodie | G06F 16/148 |
| 2018/0232534 | A1* | 8/2018 | Dotan-Cohen | H04W 12/033 |
| 2019/0014371 | A1 | 1/2019 | Couleaud et al. | |
| 2019/0058919 | A1 | 2/2019 | Cahill | |
| 2019/0205701 | A1* | 7/2019 | Huang | G06K 9/6257 |
| 2019/0379915 | A1* | 12/2019 | Braun | G06F 16/182 |
| 2020/0047666 | A1* | 2/2020 | Moffa | B60R 22/48 |
| 2020/0068040 | A1* | 2/2020 | Kim | G06F 3/0481 |
| 2020/0250696 | A1* | 8/2020 | Cordell | G07C 5/0841 |
| 2020/0307795 | A1* | 10/2020 | Jackson | G06F 3/04845 |
| 2021/0096809 | A1* | 4/2021 | Woo | G06F 3/165 |
| 2021/0256616 | A1* | 8/2021 | Hayward | G06V 30/194 |
| 2022/0005121 | A1* | 1/2022 | Hayward | G06Q 40/08 |

FOREIGN PATENT DOCUMENTS

| | | |
|---|---|---|
| WO | WO2018218259 A1 * | 11/2018 |
| WO | WO2019144096 A1 * | 7/2019 |
| WO | WO2020160334 A1 * | 8/2020 |

OTHER PUBLICATIONS

Zhenhua Huang et al., "An Efficient Passenger-Hunting Recommendation Framework With Multitask Deep Learning", Feb. 2019.*

Jinsoo Hwang et al., "Understanding first-class passengers' luxury value perceptions in the US airline industry", Tourism Management Perspectives 28 (2018) pp. 29-40.*

* cited by examiner

DYNAMIC MEDIA DATA MANAGEMENT

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to vehicle entertainment systems and the transfer of media content data thereto, and more particularly, to the dynamic resizing of media data stored onboard the vehicle entertainment system based on passenger metrics.

2. Related Art

Among the many advancements in aircraft technology, improvements in passenger comfort and convenience have received much attention. Air travel typically involves journeys over extended distances that at the very least take several hours to complete, so airlines provide onboard in-flight entertainment and communications (IFEC) systems that offer a wide variety of multimedia content for passenger enjoyment. Recently released movies are a popular viewing choice, as are television shows such as news programs, situation and stand-up comedies, documentaries, and so on. Useful information about the destination such as airport disembarking procedures, immigration and custom procedures and the like are also frequently presented. Audio-only programming is also available, typically comprised of playlists of songs fitting into a common theme or genre. Likewise, video-only content such as flight progress mapping, flight status displays, and so forth are available. Many in-flight entertainment systems also include video games that may be played by the passenger.

The specific installation may vary depending on service class, though in general, each passenger seat is equipped with a display device, an audio output modality, an input modality, and a terminal unit. The terminal unit may generate video and audio signals, receive inputs from the input modality, and execute pre-programmed instructions in response thereto. The display device is typically an LCD screen that is installed on the seatback of the row in front of the passenger, though in some cases it may be mounted to a bulkhead or retractable arm, or the like, that is in turn mounted to the passenger's seat. Furthermore, the audio output modality is a headphone jack, to which a headphone, either supplied by the airline or by the passenger, may be connected. Inputs to the terminal unit may be provided via a separate multi-function remote controller or by via a combination touch display. Although the terminal unit and display device were separate components in earlier IFEC implementations, more recently, these components and more may be integrated into a single smart monitor.

The multimedia content is encoded and stored as digital data, with a video decoder and audio decoder of the terminal unit functioning to generate the aforementioned video and audio signals therefrom. It is desirable to have a wide range of different multimedia content to satisfy the varying tastes of passengers. It is also desirable to have a sufficient volume of multimedia content so that passengers can remain occupied with entertainment for the entire duration of the flight. Accordingly, the multimedia content stored onboard the aircraft can range in the hundreds of gigabytes, if not over a terabyte. The majority of the data comprises the video programming, although the audio and video game content may be significant as well. This data is typically not stored on each individual terminal unit, but rather, in a central content server also onboard the aircraft. In this regard, the terminal unit is understood to incorporate networking modalities such as Ethernet to establish data communications with the central content server. Once a particular selection of multimedia content is requested by the passenger via the content selection application, the terminal unit may retrieve the same from the central content server, decode the data, and present it to the passenger.

Because the personal tastes and preferences of passengers can vary considerably, airlines maintain a wide range of multimedia content onboard the content server. Furthermore, in addition to variety of volume, novelty is as important for airlines to keep its passengers engaged with the in-flight entertainment system, particularly for valuable frequent fliers. A variety of modalities, including portable content loaders, wireless modules, and the like may be used to load sets of multimedia content to the content server. The content update process typically takes place on a monthly schedule, preferably during a layover between flights, such as when aircraft maintenance is conducted. For each item of multimedia content loaded on to the IFEC system in this way, however, the airlines must pay a fee. Specifically, the charges are based upon the size of the multimedia content set loaded, as well as the number of cycles or intervals over which the multimedia content is maintained on an aircraft. Scaled to an entire fleet of aircraft, these charges may be substantial, and because they are levied against the entire content set that is loaded on the aircraft, airlines are being charged for content that is viewed less frequently and/or not being viewed at all.

Accordingly, there is a need in the art for optimizing the multimedia content set that is loaded onboard the content server in a manner that more closely matches the anticipated viewing by the passengers. There is also a need to make the selection of the multimedia content set based upon detailed, granular parameters specific to the flight such as origin, destination, season, and so on.

BRIEF SUMMARY

This disclosure is directed to the dynamic management of media data, specifically the resizing of a set of media data loaded onto content servers onboard aircraft in-flight entertainment and communications systems. The resizing may be based upon user view habits collected from prior flights. The media content items that make up the media data set are viewed on the passenger terminal devices that are part of the in-flight entertainment and communications system. The size of the media data sets loaded onto the aircraft may be dynamically resized based upon adaptive inferences developed from collected user habits over multiple flight cycles, such that media content items that are viewed more often can be ranked higher and loaded in subsequent cycles. The ranking may be individually throttled by the carriers to dynamically resize the media data set. It is possible to assign the ranks based upon the preference of each user. As such, before flight, the media content items most frequently requested, along with similar types of media content items, may be preloaded for each passenger in accordance with personalized ranks from prior flights. As mentioned above, carriers are charged a fee for the size of the media content data sets and/or for each of the media content data items that are loaded onto the aircraft, to the presently disclosed system is contemplated to reduce such costs by not loading media content that is less frequently viewed or not viewed at all.

In accordance with one embodiment of the present disclosure there is a system for managing media content data sets loaded onto a content server of a vehicle entertainment system presenting media content data items to passenger terminal devices. The system may include a media content repository that stores one or more media content data items. Additionally, the system may include a usage data aggregator that is in communication with the vehicle entertainment system to retrieve usage log data from each of the passenger terminal devices connected to the vehicle entertainment system. There may also be a load set generator that is receptive to the usage log data. The load set generator may build a ranked media content data set based upon prioritization scores assigned to each of the media content data items with adaptive inferences from the usage log data. At least one of the prioritization scores may be correlated with one or more trip factors established for a subsequent vehicle trip for which the ranked media content data set is being built. The system may also include a content retriever in communication with the media content repository to transfer the one or more media content data items specified in the ranked media content data set.

Another embodiment of the present disclosure contemplates a media content manager for selectively loading media content data sets to an in-flight entertainment system. The media content manager may include a ground server that receives viewing preference and habit data from passenger terminal devices connected to the in-flight entertainment system. The ground server may also build a ranked media content data set based upon prioritization scores assigned to individual media content data items in the ranked media content data set. This assignment of the prioritization scores may be performed with adaptive inferences from the viewing preference and habit data. Furthermore, the prioritization scores may be correlated with one or more trip factors established for a subsequent flight for which the ranked media content data set is being built. The media content manager may also include a content loader interface that is connectible to the ground server and a portable content loader device. The media content data items in the ranked media content data set may be loaded on to the portable content loader device though the content loader interface.

A different embodiment contemplates a method for selectively loading media content data sets onto a vehicle entertainment system content server that presents media content items to passenger terminal devices. The method may include receiving, on a ground server, viewing preference and habit data from the passenger terminal devices connected to the vehicle entertainment system. The viewing preference and habit data may be recorded by the passenger terminal devices during at least one prior trip. There may also be a step of receiving, on the ground server, one or more trip factors established for a subsequent trip. The method may continue with assigning prioritization scores to each media content item based upon adaptive inferences from the viewing preference and habit data. The prioritization scores may be correlated with the one or more trip factors. There may also be a step of building a ranked media content data set based upon the assigned prioritization scores of each of the media content items. The method may further include transferring the media content items in the ranked media content data set to the vehicle entertainment system content server. This method may also be embodied as one or more programs of instruction executable by the ground server and stored in a non-transitory program storage medium readable by the same.

The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of the dynamic media management system. This description is not intended to represent the only form in which the embodiments of the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
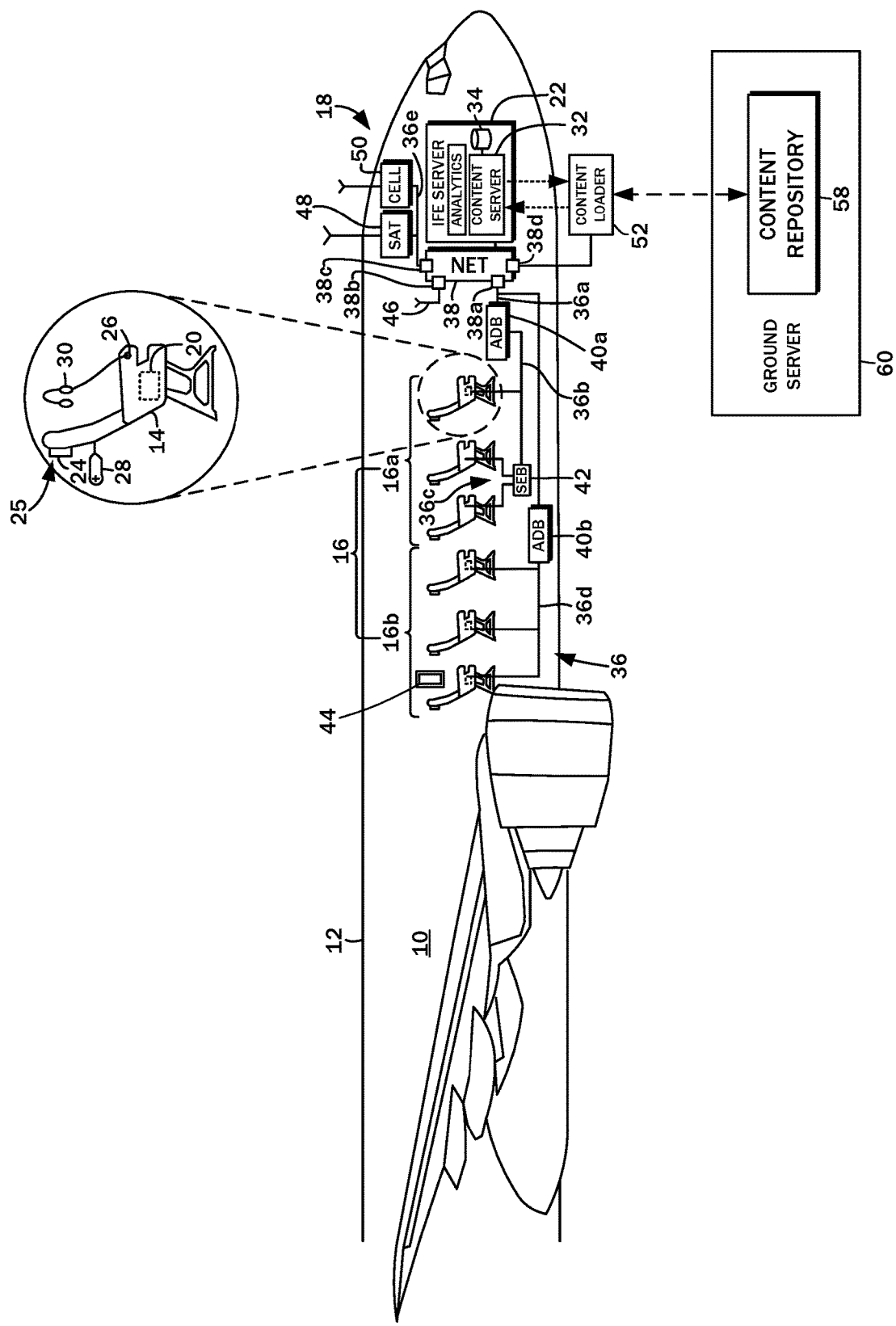
FIG. 1 is a diagram illustrating an exemplary aircraft in which an in-flight entertainment and communications system that may be utilized in one embodiment of a dynamic media management system.

FIG. 1 is a simplified diagram of an aircraft 10, generally referred to herein as a vehicle, along with select subsystems and components thereof that may be utilized in the offline payment system of the present disclosure. Within a fuselage 12 of the aircraft 10, there may be seats 14 arranged over multiple rows 16, with each seat 14 accommodating a single passenger. Although the features of the present disclosure will be described in the context of the aircraft 10, this is by way of example only and not of limitation. The presently disclosed embodiments may be applicable to other contexts as appropriate, such as, by way of non-limiting illustrative example, busses, trains, ships, and other types of vehicles.

Installed in the aircraft 10 is an in-flight entertainment and communications (IFEC) system 18, through which various entertainment and connectivity services may be provided to passengers while onboard. When referenced generally, the IFEC system 18 is understood to encompass terminal devices 20 installed for each seat 14, as well as the IFEC server 22 and the other components involved in the delivery of the entertainment and communications functionality. In the illustrated example, this includes a display 24, an audio output 26, and a remote controller or handset 28. For a given row 16 of seats 14, the terminal device 20 and the audio output 26 are disposed on the seat 14 for which it is provided, but the display 24 and the handset 28 may be located on the row 16 in front of the seat 14 to which it is provided. That is, the display 24 and the handset 28 are installed on the seatback of the row in front of the seat. Other display 24 and handset 28 mounting and access configurations such as a retractable arm or the like mounted to an armrest of the seat 14 or by mounting on a bulkhead are also possible.

The display 24 is understood to be a conventional liquid crystal display (LCD) screen or other type with a low profile that is suitable for installation on the seatback. Each passenger can utilize an individual headset 30, supplied by either the airline or by the passenger, which provides a more private listening experience. The audio output 26 may be a headphone jack that is a standard ring/tip/sleeve socket. The headphone jack may be disposed in proximity to the display 24 or on the armrest of the seat 14 as shown. The headphone jack may be an active type with noise canceling and including two or three sockets or a standard audio output without noise canceling. Each display 24 may incorporate the aforementioned terminal device 20 to form a unit referred to in the art as a smart monitor 25.

One use for the smart monitor 25 installed on the aircraft 10 is the playback of various multimedia content. The smart monitor 25 may be implemented with a general-purpose data processor that decodes the data files corresponding to the media content and generates video and audio signals for the display 24 and the audio output 26, respectively. The media content data files may be streamed to specific terminal devices 20 upon request. The content may be encrypted, so the digital rights management functionality to enable streaming/playback may be performed by the IFEC server 22. Functionality not pertaining to the delivery of media content, such as relaying imagery from external aircraft cameras, flight path/mapping information, and the like may also be performed by the IFEC server 22.

In various embodiments, the IFEC server 22 may also incorporate a content server 32 that streams or otherwise delivers the media content. Such content server 32 may be part of the same line replaceable unit (LRU) of the IFEC server 22, that is, share the same hardware components, though other embodiments are possible where the content server 32 is provided in a separate LRU. Furthermore, the content server 32 may cooperate with a data storage 34 on which the media content is stored. The data storage 34 may be a hard drive, a non-volatile memory device (NVMe) drive, or any other suitable data storage device that shares the same LRU as the content server 32, or may be implemented in a separate LRU with appropriate high-speed data links interconnecting the two. Although only a single content server 32 is illustrated in FIG. 1, there may be additional content servers sharing the processing load, and it is is possible for the media content/storage functions to be performed by the smart monitor 25, among other devices onboard the aircraft 10.

The passenger can play games being executed on the terminal device 20 and otherwise interact with the media content with the handset 28. Navigating through the vast media content library and selecting ones for viewing and/or listening is also possible with the handset 28, though in some different installations, a touch-screen display may be provided for a more intuitive interaction with the media content library. In either case, the terminal device 20 is loaded with a content selection software application that is executed by the data processor and accepts input from the handset 28 or other input modality and generates a response on the graphical interface presented on the display 24.

Each of the terminal devices 20/smart monitors 25 for the seats 14 may be connected to the IFEC server 22 as well as any or any other server that is part of the IFEC system 18, including the aforementioned content server 32 over a local area network 36, one segment of which may preferably be Ethernet. The IFEC system 18 thus also includes a data communications module 38, and more specifically, an Ethernet data communications module 38a, e.g., an Ethernet switch or router. In a typical aircraft installation, the data communications module 38 is understood to be a separate LRU and may also be referred to as a network controller (NC). Likewise, the IFEC server 22 and the other servers onboard the aircraft 10 are understood be standalone computer systems with one or more general purpose data processors, memory, secondary storage, and a network interface device for connecting to the local area network 36. The computer systems may have an operating system installed thereon, along with server applications (e.g., web servers, streaming servers, and so forth) providing various in-flight entertainment/communications services in cooperation with the terminal devices 20 connected thereto.

The local area network 36 may be logically separated into tiered segments, with the network controller/data communications module 38 being at the top of the hierarchy or central to all of the segments. The smart monitors 25 may be organized according to sections, rows, or columns of seats 14, and the local area network 36 may be structured accordingly.

There may be a first area distribution box (ADB) 40a, which may also be a line replaceable unit that is directly connected to the network controller/data communications module 38 and establishes a first segment 36a of the local area network 36 for a first set of rows 16a. Connected to the first ADB 40a over a downstream network segment 36b may be the smart monitors 25. The speed of the network segment 36b may be slower than the upstream network segment 36a. In some implementations, there may be an additional seat electronic box (SEB) 42 that handles some data processing operations shared amongst multiple smart monitors. The further downstream network segment 36c may, in turn, be shared with the peripheral devices connected to the smart monitor such as a payment terminal, a USB port, and the like.

A second ADB 40b is also directly connected to the network controller/data communications module 38 and is also part of the same network segment 36a. The second ADB 40b may be dedicated for the second set of rows 16b, with individual connections to each of the smart monitors 25 or terminal devices 20 defining a network segment 36d. Although different network segmentation hierarchies are illustrated, for example, one set of seats 14 being connected to an SEB 42, which in turn is connected to the ADB 40a, along with a direct connection between the smart monitor 25 or terminal device 20 to the ADB 40b, a typical aircraft configuration will be consistently structured.

Passengers and cabin crew alike may utilize a portable electronic device (PED) 44 during flight. PEDs 44 are understood to refer to smart phones, tablet computers, laptop computers, and other like devices that include a general-purpose data processor that executes pre-programmed instructions to generate various outputs on a display, with inputs controlling the execution of the instructions.

Although these devices are most often brought on board the aircraft 10 by the passengers themselves, carriers may also offer them to the passengers for temporary use.

Conventional PEDs 44 are understood to incorporate a WLAN (WiFi) module, so the data communications module 38 of the IFEC system 18 includes a WLAN access point 46 that is connected over a wireless network interface 38b. The PED 44, via the onboard WLAN network, may connect to the IFEC system 18 to access various services offered thereon such as content downloading/viewing, shopping, and so forth. The local area network interface or data communications module 38 is understood to encompass the hardware components such as the WLAN transceiver, antennas, and related circuitry, the Ethernet router/switch, as well as the software drivers that interface the hardware components to the other software modules of the IFEC system 18.

The IFEC system 18, including each of its constituent components, as well as the other avionics systems and the PEDs 44 onboard the aircraft 10 may communicate with ground-based network nodes via a variety of communications modalities. The network controller/data communications module 38 thus includes a remote module 38c that is connected to, for example, a satellite module 48, which establishes an uplink to a communications satellite. This uplink may be Ku-band microwave transmission modality, though any suitable modality such as Inmarsat or Iridium may also be utilized. Due to the high costs, carriers may limit data traffic to and from the satellite module 48 with a firewall or network access controller.

Alternatively, or additionally, the IFEC system 18 may incorporate a cellular modem 50 for remote connectivity, which similarly establishes a communications link via terrestrial cellular sites. This remote connectivity modality is understood to be primarily utilized while the aircraft 10 is on the ground and utilizes a cellular communications provider that offers a network gateway that routes data traffic from the cellular modem 50 to a wide area network. The cellular modem 50 may serve as a backup to the extent a local airport-based WiFi network is unavailable.

The satellite module 48 and the cellular modem 50 may be on still a different part of the local area network 36, e.g., a fifth network segment 36e. As indicated above, to limit incoming as well as outgoing traffic, this network segment 36e may incorporate a network access controller to paying users, crew members, or other subgroups of those accessing the local area network 36 onboard the aircraft 10.

As will be described in further detail below, various embodiments of the present disclosure involve the transfer of media content data to the IFEC system 18, and specifically the content server 32 and data storage 34 thereof. One modality by which this may be achieved is the use of a content loader 52, which may be carried onboard the aircraft 10 during maintenance operations that are conducted between flights or during layovers. The data communications module 38 may include an additional interface 38d that accepts a direct wired connection from the content loader 52. Alternative connection modalities such as WiFi may also be utilized to connect the content loader 52 to the data communications module 38. The content server 32 may also include a USB port or the like that makes a direct connection with the content loader 52.

The foregoing arrangement of the IFEC system 18, along with its constituent components, have been presented by way of example only and not of limitation. Other aircraft 10 may have any number of different configurations, and may incorporated components that were not mentioned above, or functions may be handled by a different subpart or component than that to which above description attributes. Along these lines, features described above may be omitted from such different configurations.

To maintain high levels of passenger engagement with the IFEC system 18, airlines regularly update the media content presented thereon. Some of the content is viewed more or less frequently than others, and so the present disclosure contemplates a system for more optimally managing the loading of media content on to the IFEC system 18 and specifically the content server 32 thereof that better reflects the viewing preferences and habits of the passenger/customer base. With additional reference to the block diagram of FIG. 2, the content loader 52 is provided with a media content data set 54 that includes, for example, a first media content data item 56a, a second media content data item 56b, and a third media content data item 56c. A given media content data item 56 is understood to be a file containing a single unit of multimedia programming, such as a movie, a television show, a news segment, a game application, and so on. However, this is by way of example only, and a longer program may be separated into multiple media content data items.

In accordance with the embodiments of the present disclosure, the media content data items 56 stored on the content loader 52 for upload to the IFEC system 18 are those that have been evaluated or inferred as more likely to be viewed by the passengers on the next flight, and omitting the programming that has been evaluated or inferred as being of less interest to such passengers. As generally illustrated in the block diagram of FIG. 1, the content loader 52 retrieves the media content data items 56 from a content repository 58 that is part of a ground server 60.

Similar to the server systems onboard the aircraft 10 described above, the ground server 60 is understood to be a standalone computer system, or multiple standalone computer systems with general purpose data processors, memory, secondary storage, and/or a network interface device for connecting to each other. The computer systems may have an operating system installed thereon, along with the server applications that implement the various components of the system for managing media content according to the embodiments of the present disclosure. The ground server 60, and specifically the content repository 58 thereof, stores the library of media content data items 56 that may be selectively transferred to the content loader 52, and eventually to the IFEC system 18.

In one embodiment of the system, the specific media content data items 56 that are to be transferred to the content loader 52 is defined by a media ranking table 62. With reference to the example shown in FIG. 3, the media ranking table 62 is a listing of each of the media content data items 56 each with an associated rank field 64, and a hash value field 66 that links the specific media content data item 56 to a database of usage logs that determine how it is ranked relative to the others. The specific structure of the media ranking table 62 is presented by way of example only and not of limitation, and may include additional fields that store data that is used for further processing that may be performed to build the media content data set 54.

The creation of the media ranking table 62 and the ordering of the individual media content data items 56 within the same is understood to be performed by a load set generator 68. The load set generator 68 may implement a machine learning process by which adaptive inferences of the suitable ranking/ordering of the media ranking table 62 are generated from usage log data. In one embodiment, this usage log data is referred to as viewing preference and habit data 70. Generally, those media content data items 56 that have been determined to be the most likely to be viewed on a subsequent flight are transferred to the IFEC system 18, while those less likely to be viewed are not. This evaluation is based upon the user viewing habits/preferences that are collected from the individual terminals devices 20/smart monitors 25 in the aircraft 10.

The viewing preference and habit data 70 may include such data points as the frequency and the number of media content data item views during the flight, the frequency and the number of each type of media content data item viewed (e.g., comedy movies, drama movies, documentaries, etc.), the duration each media content data item was viewed, the time of accessing/starting the playback of each media content data item, the trip destination and origin of flight on which the media content data item was viewed, the time of the year (month, date) of the flight on which the media content data item was viewed, the duration of the flight on which the media content data item was viewed, and so on. The foregoing is not intended to be an exhausting listing of the viewing preference and habit data 70 that could be collected by an sub-application running on the smart monitor 25, IFEC server 22, or an auxiliary IFEC server 22', and many other data points are possible. Demographic information regarding the passenger may also be collected and associated with each of these data points, including name, age, gender, place of birth or origin, and so forth. Broadly, any other statistic that may assist tracking and predicting the future usage of a given media content data item 56 may be collected on the flight.

The viewing preference and habit data 70 is collected at the ground server 60 by a usage data aggregator 72, and stored in a usage log database 74. A variety of data link modalities may be utilized to transfer the viewing preference and habit data 70 as residing on one or more of the IFEC server 22, the auxiliary IFEC server 22' and the smart monitor 25, including wireless transmissions via the cellular modem 50 or the wireless network interface 38b while the aircraft 10 is on the ground, or via the satellite module 48 mid-flight. Furthermore, the viewing preference and habit data 70 may be copied to the content loader 52 when it is connected during maintenance operations or during layovers between flights. When the content loader 52 is connected to the ground server 60, the viewing preference and habit data may be retrieved by the usage data aggregator 72. Alternative embodiments contemplate centralized virtual or cloud servers for temporary storage prior to further processing by the load set generator 68.

The collection and processing of usage log data may be extended to multiple flights encompassing multiple passengers for a given smart monitor. The collection process may also be performed on other aircraft in the fleet, as well as those of other carriers, all of which may be retrieved by the usage data aggregator 72. The media ranking table 62 refers generally to the aggregate of viewing preference and habit data 70 that has been collected, and in one implementation, may be stored as a hash value 66 thereof The popularity of a given media content data item 56 is based upon a prioritization score that is generated from the viewing preference and habit data 70. For purposes of the machine learning procedure, the specific prioritization score that is used to order the media content data items 56 in the media content data set 54 is understood to vary according to the factors of the highest importance that have been established for a subsequent vehicle trip. Thus, the prioritization score may be correlated with trip factors 76 that are input to the load set generator 68.

These trip factors 76 are understood to influence the function, weights, and/or scales that are applied to the prioritization score. For example, a given media content data item 56 with a holiday theme may be popular and viewed frequently during the holidays, though only on United States domestic flights. With a flight scheduled to originate and conclude in the U.S. in December, that media content data item 56 may be ranked the highest as most likely to be viewed during such flight. Otherwise, for example, if the same flight is scheduled in August, the holiday-themed media content data item 56 may be de-prioritized. This type of adaptive inference analysis may be performed across the entirety of the viewing preference and habit data 70 to rank and prioritize the media content data set 54 this way, and eliminate from the same those media content data items 56 that have a lower prioritization score for a particular flight. Beyond considerations of cost that limit the quantity of media content data items 56 that are ultimately transferred to the content server 32 as discussed in the foregoing embodiments, the system may also adjust the media content data set 54 based on factors such as available bandwidth for the transfer.

In a preferred embodiment, the above-described process of defining the media content data set 54 and implementing the transfer of media content data items 56 set forth therein may be automated and adjusted on the basis of seasonality and other known factors. However, certain manual modifications of the order of the media ranking table 62 is also possible, which may be applied by a threshold controller 78. Additional adjustments may be applied to the adaptive inferences used to assign the prioritization score, and the resultant media content data set may be modified accordingly. One such adjustment may be the further reduction in the number of media content data items 56 that qualify for inclusion in the data set that is loaded onto the IFEC system 18. Such a procedure may be necessary to the extent further optimization in the fees paid to the content owner is desired. This is one example of the kind of manually entered adjustments that may be made via the threshold controller 78, and those having ordinary skill in the art will recognize others that can be implemented.

Although the foregoing examples and description of the system referred to inferences that were built upon the aggregate of viewing preference and habit data 70, personalization of specific media content data items 56 may be on the basis of each individual passenger based upon information collected during prior flights. That is, the prioritization score may be based on each user/passenger, so that before a flight, the manifest information can be correlated with the individual passenger viewing preference and habit data 70 for defining a media content data set 54 personalized thereto. The adaptive inference may further identify other media content data items 56 that are thematically similar, or otherwise related along various dimensions for inclusion in the media content data set 54.

Once the media content data items 56 that are to be loaded in the media content data set 54 is established, and the media ranking table 62 is finalized, a content retriever 80 is understood to process the media ranking table 62, transfer the specified media content data items 56 from the content repository 58, and store the same into the content loader 52. In the embodiments of the system where the content loader 52 is directly attached/connected to the ground server 60 to download the viewing preference and habit data 70, as well as store the media content data set 54 for subsequent transfer to the content server 32 of the IFEC system 18, the direct physical interface may be considered a content loader interface. In alternative embodiments, the transfer of the media content data items 56 to the content server 32 may be accomplished in different ways, and so the content loader interface is understood to be those pertaining to such alternative connection/data link modalities.

Figure 2:
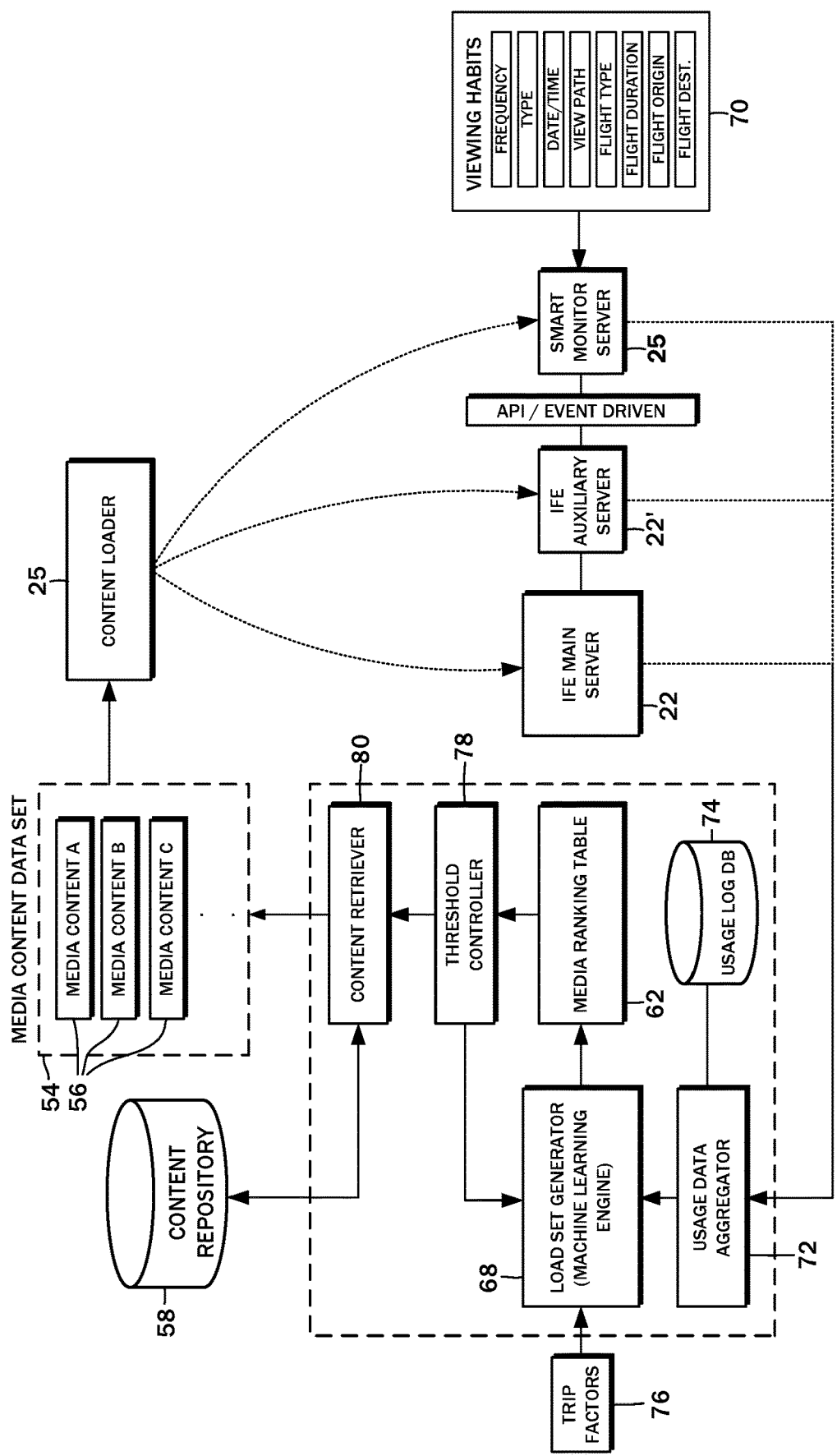
FIG. 2 is a block diagram of an embodiment of the dynamic media management system.
Figures 3, 4:
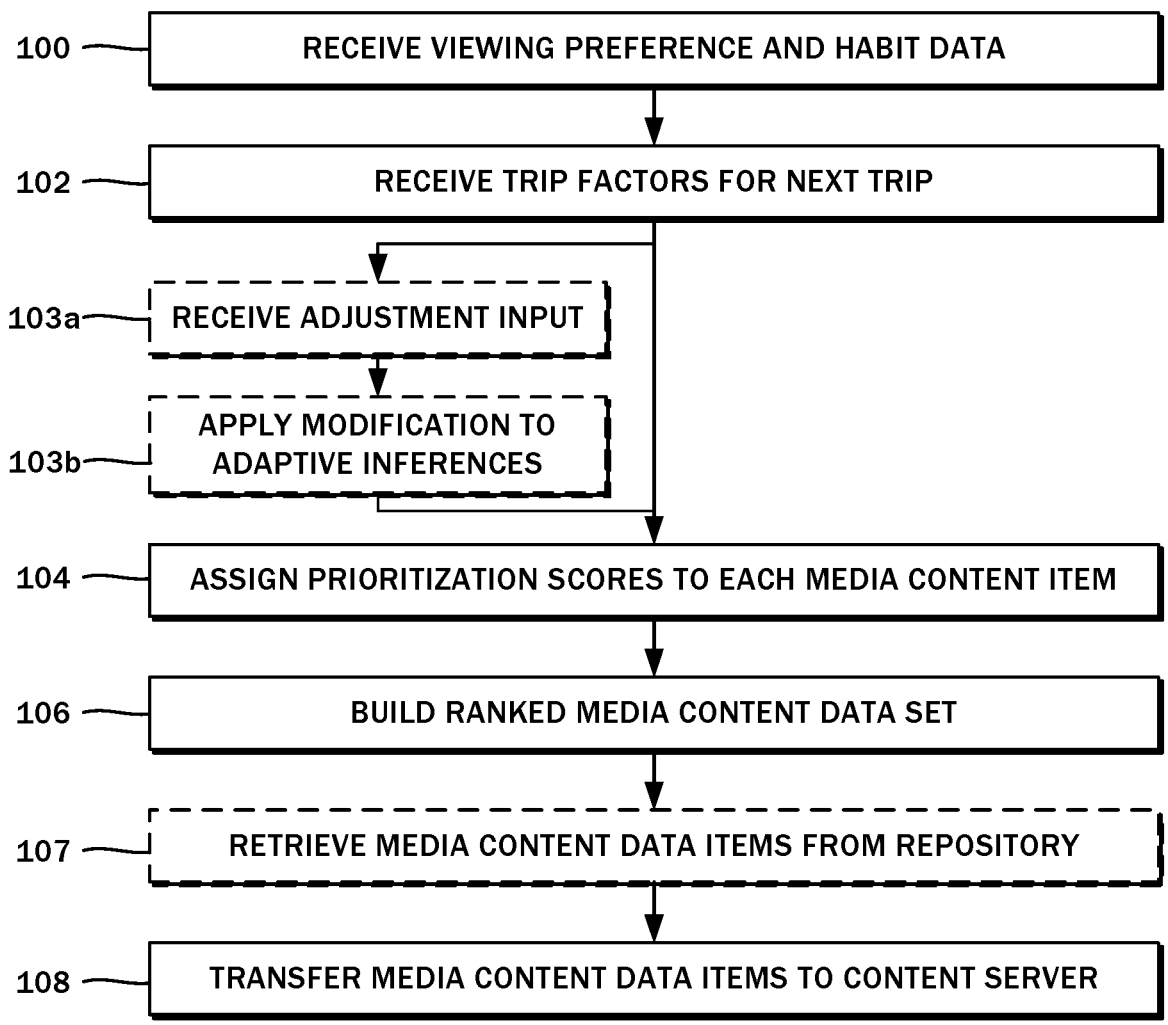
FIG. 3 is an exemplary implementation of a ranked media content data set that may be built by the dynamic media management system.
FIG. 4 is a flowchart of a method for selectively loading media content data sets onto the in-flight entertainment and communications system.

Having considered the details of the system for managing media content, as well as the media content manager of the present disclosure, another embodiment directed to a method for selectively loading the media content data sets 54 will be detailed as follows, with reference to the flowchart of FIG. 4 and the relevant components performing or otherwise impacted by the method steps as shown in the block diagram of FIG. 2. The method may begin with a step 100 of receiving the viewing preference and habit data 70 from the smart monitors 25, the IFEC server 22, and/or the auxiliary IFEC server 22', as described above. The viewing preference and habit data 70 is collected by these components as they are generated in response to passenger use, and received on the ground server 60 in some embodiments, and more specifically, the usage data aggregator 72.

The method may then involve a step 102 of receiving one or more trip factors 76 that are established for a subsequent trip. Then, a step 104 involves assigning the prioritization scores to each media content data item 56 based upon adaptive inferences from the viewing preference and habit data 70. As discussed above, the prioritization scores are correlated with the one or more trip factors 76. Adjustments may be made to the adaptive inferences in an optional procedure involving a step 103a of receiving the adjustment input, followed by a step 103b of applying the modification to the adaptive inferences in the assigning of the prioritization score to each media content data item 56.

Then, in a step 108, the media content data set 54 is built. This is understood to be based upon the assigned prioritization scores of each of the media content data items 56. Then the method proceed to a step 110 of transferring the media content data items 56 that are set forth in the media content data set 54 to the content server 32. Before this transfer occurs, however, there may be an optional step 107 of retrieving the media content data items 56 from the content repository 58.

Although the steps of the contemplated method are described in sequential order, and each successive step is assigned an increasing reference number, this is by way of example only and not of limitation. The steps of the method may be performed iteratively, and so any illustrated step may be the starting step. That is, for example, the method may begin with transferring the media content data items 56 to the content server, and the step of receiving the preference and habit data 70 may take place after the flight concludes and such data has been collected based on the currently loaded media content data set 54.

The particulars shown herein are by way of example and for purposes of illustrative discussion of the embodiments of dynamic media management and are presented in the cause of providing what is believed to be the most useful and readily understood description of the principles and conceptual aspects. In this regard, no attempt is made to show details with more particularity than is necessary, the description taken with the drawings making apparent to those skilled in the art how the several forms of the present disclosure may be embodied in practice.

What is claimed is:

1. A system for managing media content data sets loaded onto a content server of a vehicle entertainment system presenting media content data items to passenger terminal devices, the system comprising:

a media content repository storing one or more media content data items;

a usage data aggregator in communication with the vehicle entertainment system, the usage data aggregator configured to:

retrieve a first set of usage log data from a plurality of passenger terminal devices connected to the vehicle entertainment system, the first set of usage log data including first viewing preference and habit data associated with a plurality of passengers of at least one prior trip, the first set of usage log data further including demographic information of at least one of the plurality of passengers; and retrieve a second set of usage log data including second viewing preference and habit data from a subsequent trip that occurs after the at least one prior trip;

a load set generator executing a machine learning model, the machine learning model trained using the first viewing preference and habit data including a destination and an origin of a prior trip to apply adaptive inferences to generate prioritization scores, the load set generator configured to:

prior to retrieving the second set of usage log data:

apply the machine learning model to one or more trip properties of the subsequent trip to generate the prioritization scores corresponding to respective media content data items, wherein the one or more trip properties include an origin or destination of the subsequent trip;

assign the prioritization scores to each media content data item based upon the adaptive inferences from the first viewing preference and habit data, the prioritization scores being correlated with the one or more trip properties of the subsequent trip; and build a ranked media content data set for the origin and the destination of the subsequent trip based upon the assigned prioritization scores of each of the media content data items, wherein the ranked media content data set is stored in a table including a hash value corresponding to each of the media content data items that links the corresponding media content data item to a database including the first set of usage log data; and subsequent to retrieving the second set of usage log data:

adapt the machine learning model using an aggregate of usage log data that includes the second set of usage log data; and a content retriever in communication with the media content repository configured to transfer the one or more media content data items specified in the ranked media content data set.

2. The system of claim 1, wherein a number of media content data items in the ranked media content data set is less than an entirety of the media content data items stored in the media content repository.

3. The system of claim 1, wherein each of the media content data items are a single unit of programming presentable on the passenger terminal devices.

4. The system of claim 1, wherein the ranked media content data set is generated based upon a function of available bandwidth for the transfer of the one or more media content data items to the content server.

5. The system of claim 1, wherein the first set of usage log data includes data points further selected from a group consisting of: a frequency of viewing a given one of the one or more media content data items, a quantity of viewing the one or more media content data items, a quantity of viewing categories of the one or more media content data items, a duration viewed of the given one of the one or more media content data items, a time viewed of the given one of the one or more media content data items, an identity of a passenger viewing the given one of the one or more media content data items, or an origin and destination of a flight on which the one or more media content data items was viewed.

6. The system of claim 1, further comprising a threshold controller receptive to manual adjustment inputs applied to the adaptive inferences that were applied by the machine learning model in the assignment of the prioritization scores, the ranked media content data set being modified according to the manual adjustment inputs.

7. The system of claim 6, wherein the manual adjustment inputs include modifying a quantity of media content data items in the ranked media content data set.

8. The system of claim 1, wherein the content retriever stores the transferred one or more media content data items to a portable content loader device connectible to the content server of the vehicle entertainment system.

9. A media content manager for selectively loading media content data sets to an in-flight entertainment system, the media content manager comprising:
 a ground server configured to:
  receive a first set of usage log data including first viewing preference and habit data from passenger terminal devices connected to the in-flight entertainment system during a prior trip, the first viewing preference and habit data associated with a plurality of passengers of the prior trip, the first set of usage log data further including demographic information of at least one of the plurality of passengers;
  build a ranked media content data set based upon prioritization scores assigned to individual media content data items in the ranked media content data set, wherein the ranked media content data set is stored in a table including a hash value corresponding to each of the media content data items that links the corresponding media content data item to a database including the first set of usage log data,
  wherein the prioritization scores are generated by applying a machine learning model to one or more trip properties of a subsequent trip, wherein the one or more trip properties include an origin or destination of the subsequent trip, and wherein the machine learning model is trained by the first viewing preference and habit data to apply adaptive inferences to generate the prioritization scores for the subsequent trip,
  receive a second set of usage log data including second viewing preference and habit data from the subsequent trip, and
  adapt the machine learning model using an aggregate of usage log data that includes the second set of usage log data; and
 a content loader interface connectible to the ground server and a portable content loader device, the media content data items in the ranked media content data set being loaded on to the portable content loader device though the content loader interface.

10. The media content manager of claim 9, wherein the ground server includes a media content repository storing the media content data items.

11. The media content manager of claim 10, wherein a number of media content data items in the ranked media content data set is less than an entirety of the media content data items stored in the media content repository.

12. The media content manager of claim 9, wherein each of the media content data items are a single unit of programming presentable on the passenger terminal devices.

13. The media content manager of claim 9, wherein the ground server includes a threshold controller receptive to manual adjustment inputs applied to the adaptive inferences that were applied by the machine learning model in the assignment of the prioritization score, the ranked media content data set being modified according to the manual adjustment inputs.

14. The media content manager of claim 13, wherein the manual adjustment inputs include modifying a quantity of media content data items in the ranked media content data set.

15. The media content manager of claim 9, wherein the first viewing preference and habit data includes data points selected from a group consisting of: a frequency of viewing a given one of the one or more media content data items, a quantity of viewing the one or more media content data items, a quantity of viewing categories of the one or more media content data items, a duration viewed of the given one of the one or more media content data items, a time viewed of the given one of the one or more media content data items, an identity of a passenger viewing the given one of the one or more media content data items, or an origin and destination of a flight on which the one or more media content data items was viewed.

16. A method for selectively loading media content data sets onto a vehicle entertainment system content server that presents media content items to passenger terminal devices, the method comprising:
 receiving, on a ground server, a first set of usage log data including first viewing preference and habit data from the passenger terminal devices connected to the vehicle entertainment system, the viewing preference and habit data being recorded by the passenger terminal devices during at least one prior trip, the first viewing preference and habit data associated with a plurality of passengers of the at least one prior trip, the first set of usage log data further including demographic information of at least one of the plurality of passengers;
 training a machine learning model using the first viewing preference and habit data, the machine learning model trained to apply adaptive inferences to generate prioritization scores;
 receiving, on the ground server, one or more trip properties of a subsequent trip;
 applying the trained machine learning model to the one or more trip properties to generate the prioritization scores corresponding to respective media content items, wherein the one or more trip properties include an origin or destination of the subsequent trip;
 assigning the prioritization scores to each media content item based upon the adaptive inferences from the viewing preference and habit data, the prioritization scores being correlated with the one or more trip properties;
 building a ranked media content data set based upon the assigned prioritization scores of each of the media content items, wherein the ranked media content data set is stored in a table including a hash value corresponding to each of the media content items that links the corresponding media content item to a database including the first set of usage log data;
 transferring the media content items in the ranked media content data set to the vehicle entertainment system content server;

receiving, on the ground server, a second set of usage log data including second viewing preference and habit data from the subsequent trip; and adapting the machine learning model using an aggregate of usage log data that includes the second set of usage log data.

17. The method of claim 16, further comprising:

receiving a manual adjustment input;

applying a modification based on the manual adjustment input to the adaptive inferences that were applied by the machine learning model in the assigning of the prioritization score to each media content item; and in response to the modification to the adaptive inferences, modifying the ranked media content data set.

18. The method of claim 17, wherein the manual adjustment input includes modifying a quantity of media content items in the ranked media content data set.

19. The method of claim 16, further comprising:

retrieving the media content items in the ranked media content data set from a media content repository in communication with the ground server.

20. The method of claim 19 wherein a number of media content items in the ranked media content data set is less than an entirety of the media content items stored in the media content repository.

* * * * *